UNITED STATES PATENT OFFICE.

CHARLES FOX, EDWARD FOX, AND ROY S. FOX, OF YORK, PENNSYLVANIA, ASSIGNORS TO ROY S. FOX, OF YORK, PENNSYLVANIA.

MANUFACTURE OF BREAD.

1,377,825.　　　　　　Specification of Letters Patent.　　　Patented May 10, 1921.

Application filed April 17, 1918. Serial No. 229,141.

*To all whom it may concern:*

Be it known that we, CHARLES FOX, EDWARD FOX, and ROY S. FOX, citizens of the United States, residing in York, York county, Pennsylvania, have invented certain Improvements in the Manufacture of Bread, of which the following is a specification.

Our invention relates to the manufacture of bread, more particularly bread made in accordance with the restrictions imposed at the present time respecting the use of wheat flour and the employment of substitutes therefor; and the main object of our invention is to produce an improved form of bread with the use of substitute cereals and other materials which are combined with wheat flour in a special and particular manner. A further object of our invention is to facilitate the making of the dough for such bread and to expedite its production, and a still further object is to so combine the wheat flour with the substitutes employed that the qualities which make wheat flour so desirable for white bread are not affected nor impaired by such substitutes and the latter are maintained substantially free of the fermentation which the wheat flour undergoes.

The dough made with wheat flour may be a "sponge" dough in which such "sponge" is made in any usual way and fermented and then thoroughly mixed with the required additional amounts of flour and water in the mixing bowl, or what is termed a "straight" dough may be made and allowed to ferment in the usual manner. Following this, in the same mixing bowl or another, as may be most convenient or desirable, the "second" cereals, that is to say, the substitute cereals, with the other ingredients, are mixed in a homogeneous mass. This is purely a mechanical mixture, without yeast, and should be carried on for a period of time sufficient to insure thorough and complete admixture of the several ingredients, which include substitute flours, sweetening, salt, shortening and water, and after this mixture is completed the two, separately prepared, doughs are combined. The mechanical combination of these two doughs may be carried out in a mixing bowl of the same type in which the separate doughs have previously been prepared. Upon completing the mixture of the two doughs, the combined dough is taken out and by preference subjected to a kneading or compressing operation. This may be effected by passing the dough a number of times through a series of suitable rolls or other mechanism, after which the combined dough is ready for the usual cutting or scaling, balling and tempering operations preliminary to being placed in the pans, proofed, and then sent to the ovens for baking.

In carrying out our invention we may employ mixing bowls or machines of any usual or approved type in which the batches of dough are prepared, and rolls or other devices for operating upon the dough in lieu of kneading or as effecting what may be termed a kneading action.

These and other features of our invention are more fully described hereinafter, reference being had to the accompanying drawings which show, diagrammatically, mechanism capable of employment in carrying out our invention, and in which:

Figure 1, shows a mixing bowl in which the dough we term "No. 1," may be prepared.

Fig. 2, shows a similar bowl in which the dough we term "No. 2," may be prepared.

Fig. 3, shows a similar bowl in which the final dough, constituting the combination of dough "No. 1" and dough "No. 2," and which we have termed dough "No. 3," may be prepared, and Fig. 4, is a diagrammatic view illustrating rolls which may be employed to knead or compress dough "No. 3."

In carrying out our invention we may employ any suitable form of mixer or mixing bowl now in common use, and we prepare in any usual manner in the mixing bowl A, for instance, Fig. 1, what we may term dough "No. 1," which consists of wheaten flour and water, with the usual shortening, sweetening, leavening ingredients, salt, etc., heretofore and commonly employed in the manufacture of the usual wheaten or what is known as white bread.

Thus we may make a dough comprising a shortening agent, employing for such purpose a grease or fat (lard for instance); a sweetening agent, such as sugar; salt; a leaven, as yeast; wheat flour, and the necessary or usual amount of water, with or the "second" cereals as would be necessary if they were included in the preparation of a dough containing wheat flour.

In dough "No. 1," some of the sweetening and shortening could be omitted and supplied by dough "No. 2," but it is not believed that the same results could be obtained by omitting all, as in a sponge, as it would produce a different result.

By making a "straight" dough as heretofore known, and only using wheat flour therein, because wheat flour has a peculiar gluten which is absent in other cereals, and by developing this alone, a strong dough and strong healthy dough cells are obtained. If the "second" cereals had been added and caused to ferment with the wheat flour, the absence of gluten in the "second" cereals would have impaired the gluten in the wheat flour, and the result would be a poorly expanded loaf.

By our process it is possible to add more "second" cereals to wheat flour, thereby effecting a saving of wheat flour and getting better expansion, color and texture than any other method heretofore known.

The keeping qualities of our improved bread have been much enhanced through the non-fermenting of the "second" cereals in the early stages of the dough fermentation, as the nutritious qualities of these cereals have not been absorbed by the yeast and the gases present during fermentation.

After the completion of dough "No. 3," it should not lie any length of time, but should go into divider at once, thereby saving much time, and the proofing in the pans should be very brief, thereby saving additional time.

By our improved method, over-fermentation of the "second" cereals is prevented, as they are introduced into dough "No. 1," only after such dough is ready for making into loaves. By this method the "second" cereals are mechanically introduced into the final dough instead of being originally mixed with dough "No. 1" and then allowed to ferment. Over-fermentation of the "second" cereals makes them almost indigestible and productive of serious trouble in the digestive tract.

It is possible to incorporate more water in the final dough, or dough "No. 3," by our improved method than the usual methods of making dough owing to the fact that the water employed in mixing the "second" cereals of dough "No. 2," which is not initially fermented, is retained therein. As there is no fermentation of this dough, the usual evaporation accompanying fermentation does not take place.

By "second" cereals we mean any substitute or substitutes available for use in the manufacture of bread in connection with wheat flour, and may include the vegetable flours and meals as well as flours and meals made from all cereals other than wheat.

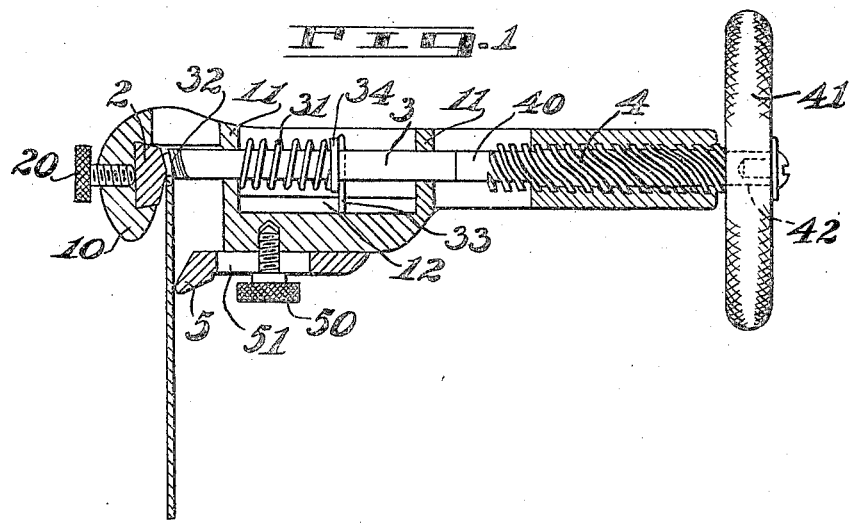
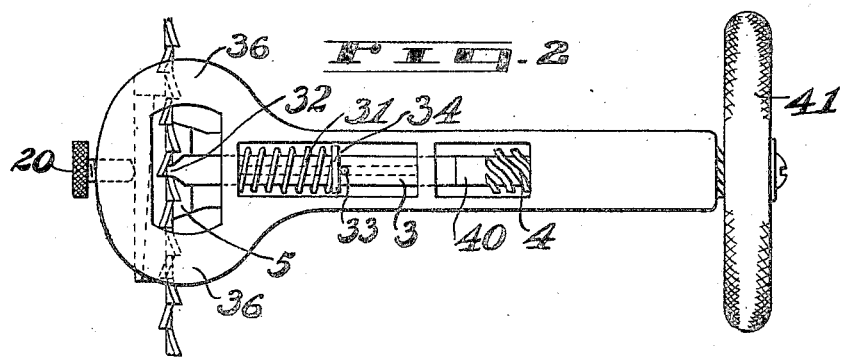
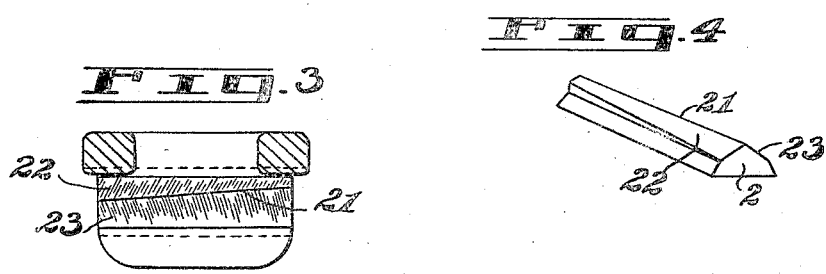

We claim:

1. The process of making bread, which comprises preparing a fermented dough containing wheat flour and other ingredients normally included in an ordinary wheaten dough, preparing a dough of non-wheat cereals mechanically incorporated with other materials without fermentation, mixing the two doughs together and operating on the mixture to prevent active fermentation, cutting, balling and proofing portions of the mixed dough, and then baking such portions before fermentation of the combined doughs becomes active.

2. The process of making bread, which comprises preparing a fermented dough containing wheat flour, sweetening, shortening, salt, leaven and water, preparing a second unfermented dough of non-wheat cereals, sweetening, shortening, salt, milk, and water, permitting the first named dough to ferment in the usual manner, intimately mixing the two doughs, and finally cutting, balling, proofing and baking loaf portions of the combined dough before fermentation of said dough can become active.

3. In the art of making bread, the process which consists in making a fermented dough of wheaten flour, making a second unfermented dough of cereals in which wheaten flour is omitted, mixing the two doughs, kneading or compressing the mixture so prepared, and immediately balling, proofing and baking loaf portions of the combined dough before fermentation of the combined dough can become active.

CHARLES FOX.
EDWARD FOX.
ROY S. FOX.